US012602950B2

(12) United States Patent 
Gallagher et al.

(10) Patent No.: US 12,602,950 B2 
(45) Date of Patent: Apr. 14, 2026

(54) SYSTEM AND METHODS FOR IDENTIFYING A VERIFIED SEARCHER

(71) Applicant: ImageShield LLC, Fairfax, VA (US)

(72) Inventors: Michael Gallagher, Fairfax Station, VA (US); Vinay Kumar Thadem, Fairfax, VA (US)

(73) Assignee: ImageShield LLC, Fairfax, VA (US)

( * ) Notice: Subject to any disclaimer, the term of this patent is extended or adjusted under 35 U.S.C. 154(b) by 299 days.

(21) Appl. No.: 18/499,412

(22) Filed: Nov. 1, 2023

(65) Prior Publication Data

US 2025/0140020 A1 May 1, 2025

(51) Int. Cl.
*G06V 40/16* (2022.01)

(52) U.S. Cl.
CPC .......... *G06V 40/172* (2022.01); *G06V 40/178* (2022.01)

(58) Field of Classification Search
CPC ..... G06V 40/172; G06V 40/178; G06V 10/82
See application file for complete search history.

(56) References Cited

U.S. PATENT DOCUMENTS

| | | | | |
|---|---|---|---|---|
| 2007/0258627 | A1* | 11/2007 | Geng ...................... | G06F 18/28 382/280 |
| 2016/0307030 | A1* | 10/2016 | Samet ...................... | G07C 9/00 |
| 2019/0042837 | A1* | 2/2019 | Mardikar ............. | G06V 40/172 |
| 2021/0042527 | A1* | 2/2021 | Ton-That .............. | G06F 18/214 |
| 2022/0342962 | A1* | 10/2022 | Gallagher .............. | G06F 21/10 |

* cited by examiner

*Primary Examiner* — Wassim Mahrouka 
(74) *Attorney, Agent, or Firm* — Lathrop GPM LLP; Alex Shtraym

(57) ABSTRACT

The invention relates generally to protecting content via facial recognition technology and more particularly to a system and methods for identifying a verified user in searchable media based on facial recognition. The system may be configured to receive content and verify that the content corresponds to the user. The system may then process verified content to extract features corresponding to the verified user's face. The system may implement facial recognition technology to identified instances of use of the verified content in searchable media and produce a report including one or more selectable actions corresponding to each instance of identified use of the verified content. Advantageously, the system may be configured to output a report of a user efficient and effectively and further provide the user with one or more recommendations corresponding to the verified content.

20 Claims, 13 Drawing Sheets

200

200

START

RECEIVE CONTENT DATA IN REAL-TIME
202

ANALYZE CONTENT DATA
204

VERIFIED CONTENT?
206

YES

NO

INITIATE VERIFICATION PROCESS
208

STORE VERIFIED CONTENT IN REPOSITORY
210

END

500

506

502

508

Continue

1. Place your face in the oval...
2. Turn your face to your right
3. Turn your face to your left
4. Look up
5. Look down
6. Perform action-based verification

504

CONTINUED FROM STEP 208

OBTAIN VERIFIED CONTENT
602

NORMALIZE CONTENT DATA
604

FEED NORMALIZED DATA
THROUGH FACIAL MODEL
606

GENERATE FACIAL VARIANTS
608

LINK VARIANTS TO VERIFIED
CONTENT
610

END

600

1300

SYSTEM AND METHODS FOR IDENTIFYING A VERIFIED SEARCHER

FIELD OF THE INVENTION

The invention relates generally to protecting content via facial recognition technology and more particularly to a system and methods for identifying a verified user in searchable media based on facial recognition.

BACKGROUND

Biometrics often refer to measurable physiological or behavioral characteristics of an individual useful in verifying or authenticating an identity of the individual for a particular application. Existing biometric authentication techniques include fingerprint verification, voice recognition, retinal or iris scanning, signature verification, and facial recognition.

Generally, facial recognition technology is used as a security tool by hospitals, banks, airports, and government agencies. For example, law enforcement often relies on facial recognition technology for conducting searches against a database containing millions of facial images to match and identify a suspect.

Typically, however, facial recognition systems and corresponding databases are not publicly available to prevent hackers and people committing fraud from stealing user information or otherwise misusing images and content that they are not authorized to access or search for. On the other hand, availability of facial recognition systems may allow users to better monitor and protect their images and identities.

Accordingly, there is a need for a system that may be configured to facilitate identifying a verified user in searchable media based on facial recognition and, upon identifying instances of the verified user, the system may generate and transmit a report of such instances. The present invention satisfies this need.

SUMMARY

The invention relates generally to a system that a verified searcher can use to search for the use of their face in searchable media and systems, and to receive a report on those uses, whether rendered in photography, videography, illustration, or serendipitously approximated in a generative artificial intelligence (GAI) construct.

Users of the system may need to consent to have their face and head scanned using, for example, scanners/mappers available through a mobile, desktop, or other electronic system. Real-time scanning and mapping may be done to verify that the face to be searched for is the face of the searcher. Furthermore, it is contemplated that the system may include a "family" setting such that parental consent is required.

Once a user's face is scanned and mapped the facial data and images may be monitored and protected. For instance, the system may be configured to produce a face print or a digitally recorded representation of a person's face that can be used for security purposes. Certain configurations of the system may generate alternate variants of the user's face so that those variants may also be searched for. For example, a man with brown hair and no facial hair may have variants created in which he is bald, has a mustache, has red hair, etc. Digital representations of a person's face and other content may then be submitted to a facial recognition system that searches available media and systems for appearances of the face(s).

The system may further be configured to deliver search results of verified content to the user. Search results may be delivered on a one time, scheduled, or periodic basis. It is further contemplated that the system may be configured to provide for redress of unwanted uses of verified facial data and images. For example, the system may facilitate the preparation and delivery of take-down or cease-and-desist notices to identified points of contact at media or systems that have rendered, knowingly or otherwise, a verified searcher's face or variation on the face. Further, through which verified users will have previously granted copyright to verified facial images and variants, may facilitate the intermediation of legal services and the initiation of legal actions on behalf of one or more verified searchers whose faces have not been removed from searchable media or systems after one or more requests.

In operation, the system may be configured to receive user content in real-time. The content may include a user's face, which the system is configured to analyze.

Further, the system may be configured to verify that the content corresponds to the user and store verified content in a repository. Verification may include an action-based verification, geographical verification, and audit verification. For instance, the system may output one or more prompts to a user, monitor the content, and approve or deny verification based on determining whether the user has performed the prompts.

The system may also process verified content to capture image data corresponding to features of the user's face. As mentioned above, the processing may further include generating one or more variants of the verified content and linking such variants to the verified content. For example, the system may implement one or more generative facial models configured to change one or more features of the user's face in verified content.

Once verified, the system may initiate a monitoring process to scan one or more databases or searchable resources and identify instances of the verified content. The monitoring may include accessing searchable media and, through use of facial recognition, identifying instances of use of the same or similar features in the verified content. Identified instances of use may be output to a verified user in a report including one or more selectable actions. Selectable actions may include, for example, ignore instance, ignore domain, report improper use, add to a category, request take-down, file copyright, take legal action.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

The preferred embodiments of the invention will be described in conjunction with the appended drawings provided to illustrate and not to limit the present invention, where like designations denote like elements, and in which.

DETAILED DESCRIPTION OF THE INVENTION

The invention relates generally to facial recognition technology and more particularly to a system and methods for identifying a verified user in searchable media based on facial recognition. Also, the system may facilitate maintaining a registry of content associated with one or more verified user for comparing against content created via artificial intelligence technology. Advantageously, the system may be configured identify a verified user in searchable media and, upon identifying instances of the verified user, the system may be configured to generate and output a report to the verified user including one or more recommendations and/or options relating to the identified use.

Figure 1:
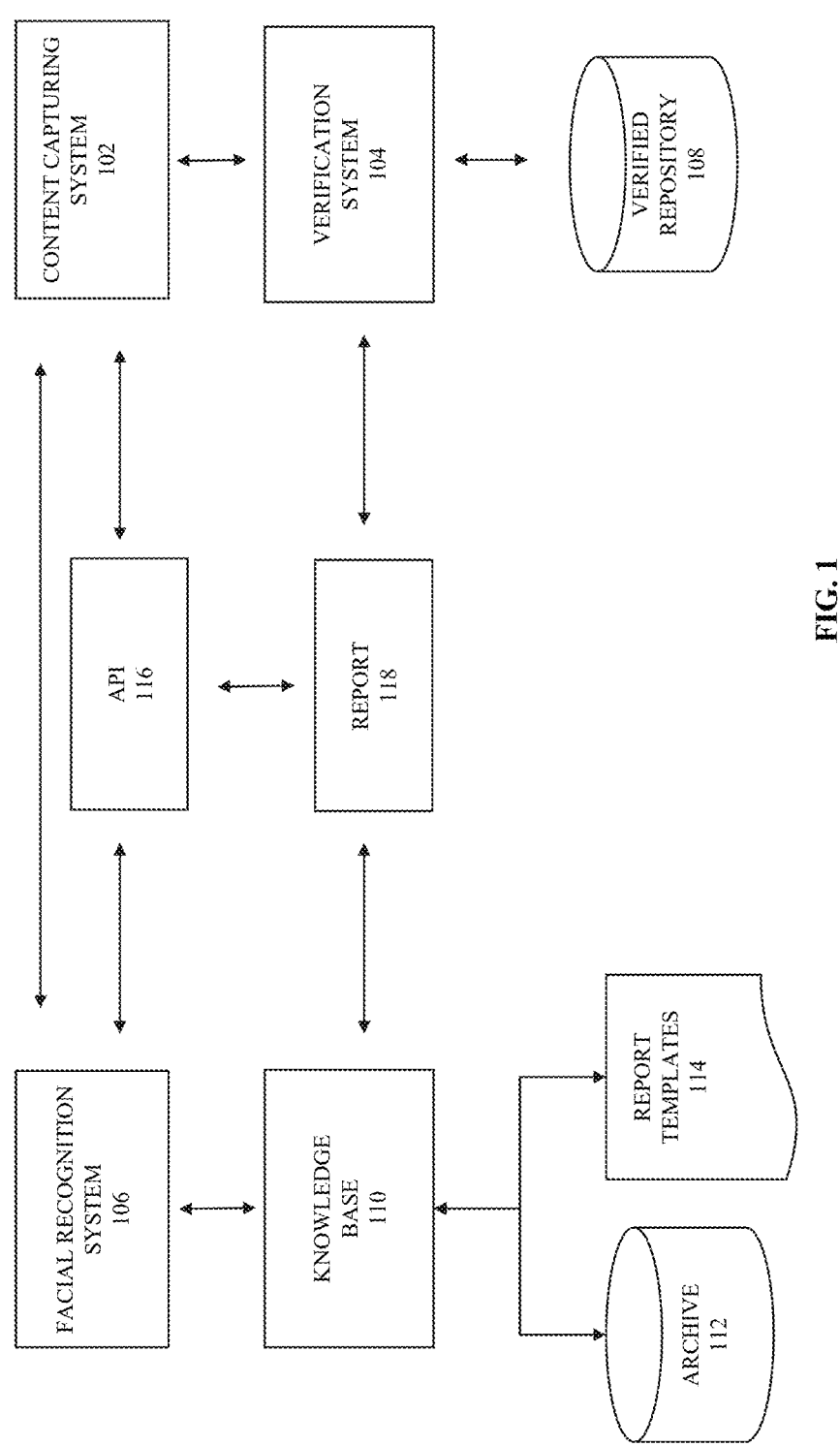
FIG. 1 illustrates an exemplary system that may be used to implement the methods according to the present invention.

Turning to the figures, FIG. 1 illustrates an exemplary system 100 that may be used for implementation of all or a portion of the processes detailed below. As shown, system 100 may include a content capturing system 102, a verification system 104, and a facial recognition system 106. While certain components of system 100 are shown as separate interoperating systems, it is contemplated that functions performed by these components may be subsystem components of a single integrated system.

Content capturing system 102 may receive and process content data in accordance with the techniques described herein. For example, the content capturing system 102 may receive and process content corresponding to a face of a user in real time to, for example, support validation of the content by verification system 104. Examples of content data may include image data, video data, audio data, and the like. It is contemplated that, image or video data may be captured in real time by, for example, a camera, an application configured to capture content data, or other capturing device of system 100 or communicatively coupled with system 100.

Content capturing system 102 may include one or more hardware, software, or firmware components that implements the functions described herein. For instance, capturing system 102 may one or more components for communicating with other components of the system 100 or third-party components, components for obtaining content data, components for processing the captured data and corresponding metadata, and the like. Examples of capturing component 102 may include a smartphone, table, computer, and other devices.

Content capturing system 102 may further include one or more software applications. Software application may facilitate capturing a particular type of content data, such as images and videos. In one example, capturing system 102, through use of one or more software applications, may be configured to analyze content to identify certain attributes corresponding to the content, such as metadata (or "meta data") and other information. It is further contemplated that capturing system 102 may facilitate generating a face print, such as through use of a standard library and/or according to a unique function of system 100. The generated face print of the controlled content may then be compared to other face prints, digital representations, and content (internal and/or external to system 100) for monitoring and protection purposes. Comparison of faceprints—and other digital representations of a user's face—may be used to, for example, evaluate the authenticity of verified content and/or to determine possible use (authorized or unauthorized) of the verified content by others, as detailed below.

Moreover, capturing system 102 may facilitate image processing such that features (e.g., boundaries, contours, shapes, or configurations of image content) may be automatically detected and distinguished. It is also contemplated that on or more software applications of capturing system 102 may be configured to receive or retrieve content data, such as from a database or image repository.

Content capturing system 102 may also be configured to support single and multi-device implementations. For instance, in a single device implementation, content capturing system 102 may include a single device that captures and processes content data in accordance with the techniques described herein. Alternatively, in a multi-device implementation, aspects of content capturing system 102 may be distributed across two or more devices. For example, a first imaging device may capture content data and transfer the captured content data to a computing device configured to process the captured content.

Verification system 104 is configured to verify that user content (e.g., face of the user) captured by capturing system 102 corresponds to the user. For instance, verification system 104 may facilitate validating that the content received by system 100 corresponds to the user's face. For example, verification system 102 may be based on matching user content to enrolled biometric (e.g., facial) data stored in a repository accessible to system 100, such as repository 106. Moreover, verification system 102 may be configured to output one or more prompts to a user corresponding to an action-based verification, geographical verification, and audit verification.

An action-based verification may include prompting a user to perform one or more actions. Content capturing system 102 may be configured to capture actions performed by the user, which verification system 104 may then analyze for verification purposes. Actions prompted by system 100 may include motion-based actions, such as moving, placing, posing or orienting one or more body parts (e.g., head, eyeballs, arms, hands, fingers, legs, torso, and other body parts) in certain positions. For instance, the system 100 may prompt a user to put up two fingers, capturing system 102 may be configured to monitor and capture the user's movement, and verification system 104 may be configured to verify the user in response to determining that the user has put up two fingers. Other action-based verifications are contemplated, such as applying pressure on touch or pressure sensitive surface.

A geographical verification may be based on the user's location, which system 100 may determine automatically or in response to a user input. For example, verification system 104 may be configured to inspect location metadata that is attached to received content to determine if the location metadata is consistent with the address of the user. In another example, verification system 104 may prompt the user to, for example, upload a symbol or image that is commonly associated or seen within a community or neighborhood. In yet another example, geographical verification may be based on an IP network, cellular triangulation, and other geo-location based protocols or techniques.

An audit verification may include prompting a user to upload one or more forms of personal identification, which verification system 104 may analyze for verification purposes. Examples of personal identification may include, without limitation, a passport, a driver's license, a national identification document, a credit card, a bankcard, an authorized employee card, and the like. It is further contemplated that verification system 104 may be configured to verify a user based on other forms of personal information, such as a passport number, bank account number, credit card number, driver's license number or social security number.

Content verified by components of system 100 may be stored in repository 108 (for example, a DICOM archive) for display, review, analysis, and/or annotation. Content in repository 108 may be utilized by, for example, facial recognition system 106 as detailed below. Examples of content in repository 108 may include audio, video, images, structured documents, and plain text. For purposes of this application, content stored in repository 108 may be referred to as verified or enrolled content.

Facial recognition system 106 may be configured determine whether content accessible to system 100 and the verified content stored in repository 108 display sufficient similarity to identify a verified user. More specifically, facial recognition system 106 may analyze content found in search media with verified content to determine whether the images match for purposes of identifying a verified user. In some examples, the match may be based on whether a similarity score meets a threshold similarity or similarity score threshold. For instance, system 100 may determine whether the facial images found in searchable media conform to a verified user by comparing one or characteristics of searchable media content to one or more corresponding characteristics of the verified content. Examples of such characteristics may include iris color, dimensions of facial features such as an eye nose, mouth, etc., hair color, and head dimensions, to name a few.

One or more components of system 100 may further facilitate performing feature extraction and classification. For instance, feature extraction may include assigning numeric values, or feature vectors, to key features of a user's face. Classification may be performed by a classifier configured to compare feature vectors of third-party content to feature vectors of verified content. It is further contemplated that feature vectors of verified content may be pretrained into a neural network (e.g., a facial composite model) to, for example, determine a match with an existing face or to generate a new face or sub-variant of the user's face that may be linked to the verified content, as detailed below.

In system 100 of FIG. 1, the interaction between the capturing system 102, verification system 104, and the facial recognition system 106, and that which results from that interaction may be facilitated using an applications program interface ("API") 114. In particular, API 116 may facilitate the bi-directional association between the attributes of verified content from repository 108 and the information identified and/or extracted from searchable media that corresponds to these attributes, which may be provided through a knowledge base 108.

Knowledge base 108 may be used to provide access to information identified and/or extracted from searchable media stored in an archive 112. System 100, such as via facial recognition system 106, may then compare the information identified and/or extracted from each source against verified content from repository 108 to detect instances of use of same or similar content. In one exemplary operation, system 100, such as through API 116, may then be configured to the metadata and/or attributes of content from searchable media with that of the verified content stored in repository 108. If the metadata and/or attributes match or closely match that of the verified content, system 100 may flag the instance for reporting to a corresponding verified user, as detailed below.

Exemplary Flowcharts

Figure 2:
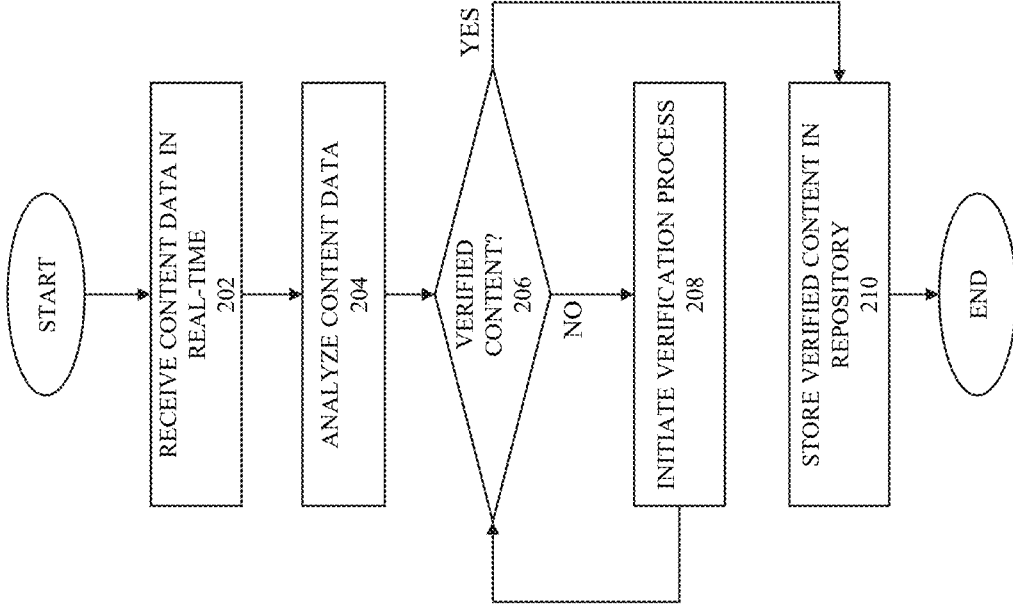
FIG. 2 is a flowchart illustrating an exemplary method for verifying and storing user content.

FIG. 2 illustrates a flowchart 200 for verifying user content and storing verified content in a repository of the system. The method of operation begins and, in step 202, the system may receive content data (e.g., images of a user's face) in real-time. In one aspect, a camera of a mobile device may be utilized to facilitate real-time, flexible, and/or mobile capture and recordation of data by one or more users.

It is contemplated the content received by the system corresponds to a registered user. For instance, a user can register by linking their account with an existing account from a third party platform, such as Google, Facebook, or Twitter. Also, a user may create an account by inputting an identifier and a password. If no other uses of the same identifier are detected, then the system may store the entered user identifier and password for a newly registered user. Additional information may be collected from the user including, for example, age, contact information, occupation, and the like.

Furthermore, the system may associate one or more additional features with the registered user based on their status (paid or freemium, for example). It is contemplated that a freemium user may access one or more of the features available to paid users by, for example, completing task or activities, such as referring a friend, linking one or more social media accounts, and the like. Additional features may relate to the amount of content verified by the system, the actions available in response to an instance of use of the same or similar content, the ability to protect and share the content, and the like.

In step 204 of FIG. 2, the system may analyze the content data. The system may be configured to analyze the content in real-time using known techniques and/or unique algorithms that facilitate video, voice, and image recognition. For example, the system may be configured to analyze a user's facial features, which are used to generate a facial fingerprint or nodal points on the user's face. Nodal points may be endpoints used to measure variables of a user's face, such as the length or width of the nose, the depth of the eye sockets and the shape of the cheekbones. As a result, the system may facilitate capturing data for nodal points and storing the resulting data as a facial fingerprint. Facial fingerprints may be stored as single images or frames or a set of images/frames, e.g., a short video, or in any suitable format or file for further analysis. The facial fingerprint may further be used as a basis for comparison with data captured from faces in searchable media.

Figure 3:
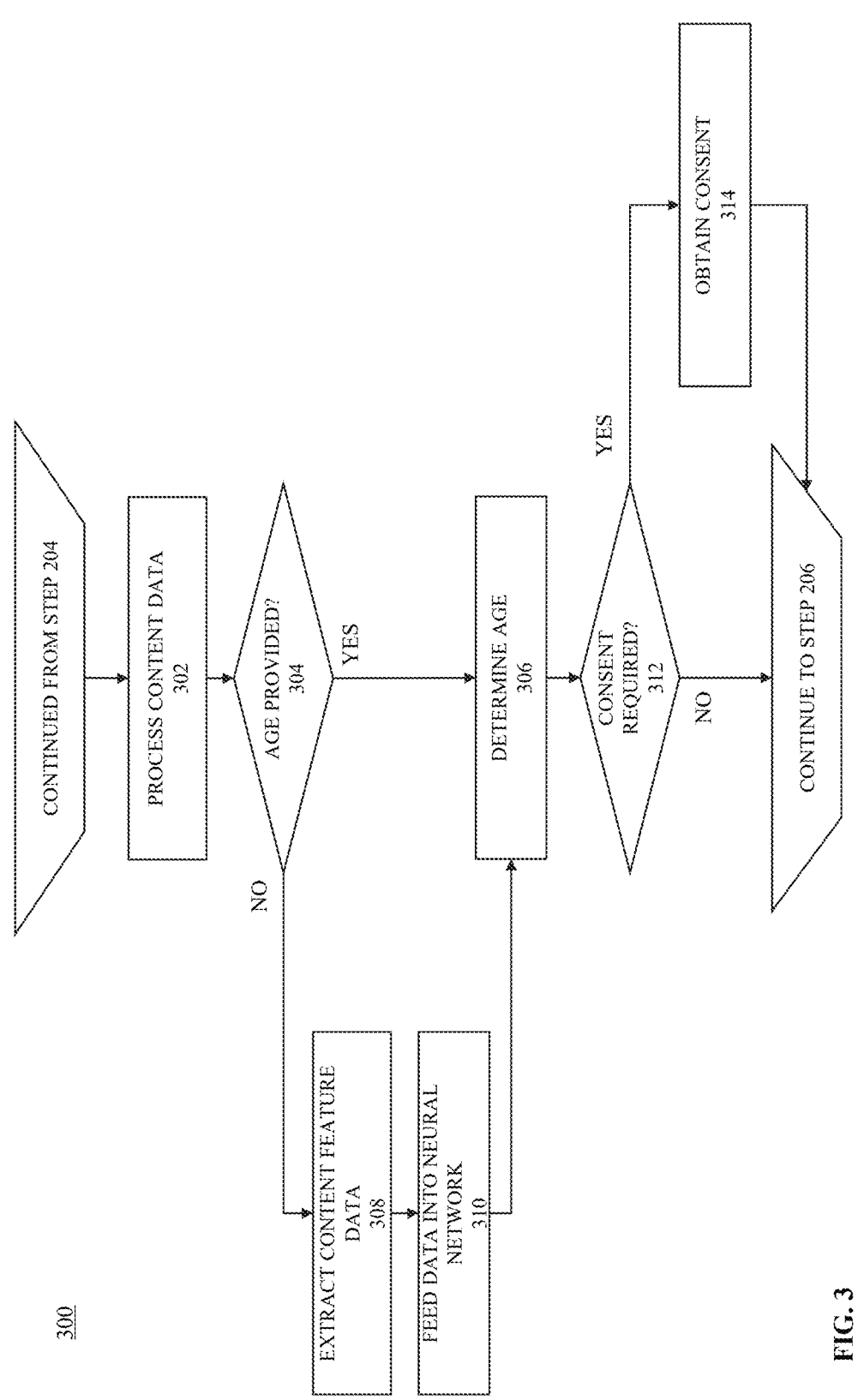
FIG. 3 is a flowchart illustrating an exemplary method for processing user content to determine the age of a user.

FIG. 3 is a flowchart 300 providing more detail of step 204 of FIG. 2 for determining an age of the user based on content received by the system. The operation is continued from step 204, and in step 302, the system may be configured to further process the content data received. In decision step 304, the system may determine whether an age associated with the user is provided. If at decision step 304, the age of the user is provided, in step 306, the system may determine the age.

If at decision step 304, the age of the user is not provided, in step 308, the system may extract features of the content, including, but not limited to, boundaries, contours, shapes, and the like. In step 310, the system may feed the content data into a neural network, such as a neural network configured to predict the age of the user captured in content. The method will then continue to step 306, in which the system will determine the age of the user based on an output of the neural network.

In decision step 312, the system may be configured to determine whether additional consent is required. For instance, the system may require parental consent before obtaining information or content from a minor. Users who are older than the threshold applicable may be able to give consent themselves. If in decision step 312, consent is required, in step 314, the system will obtain consent before the operation proceeds. If in decision step 312, no consent is required, the system will continue to step 206 of FIG. 2.

Returning to flow chart 200 of FIG. 2, in step 206, the system may be configured to determine whether the content received corresponds to a verified content. For instance, the system may verify the received content based on a comparison with verified content stored in a repository accessible to the system and/or based on information associated with a registered user of the system. If at decision step 206, the system determines that the content is verified, in step 210, the system may store the verified content in a verified repository. Further, the system may link the verified content with a registered user and/or other content in the repository.

Figure 4:
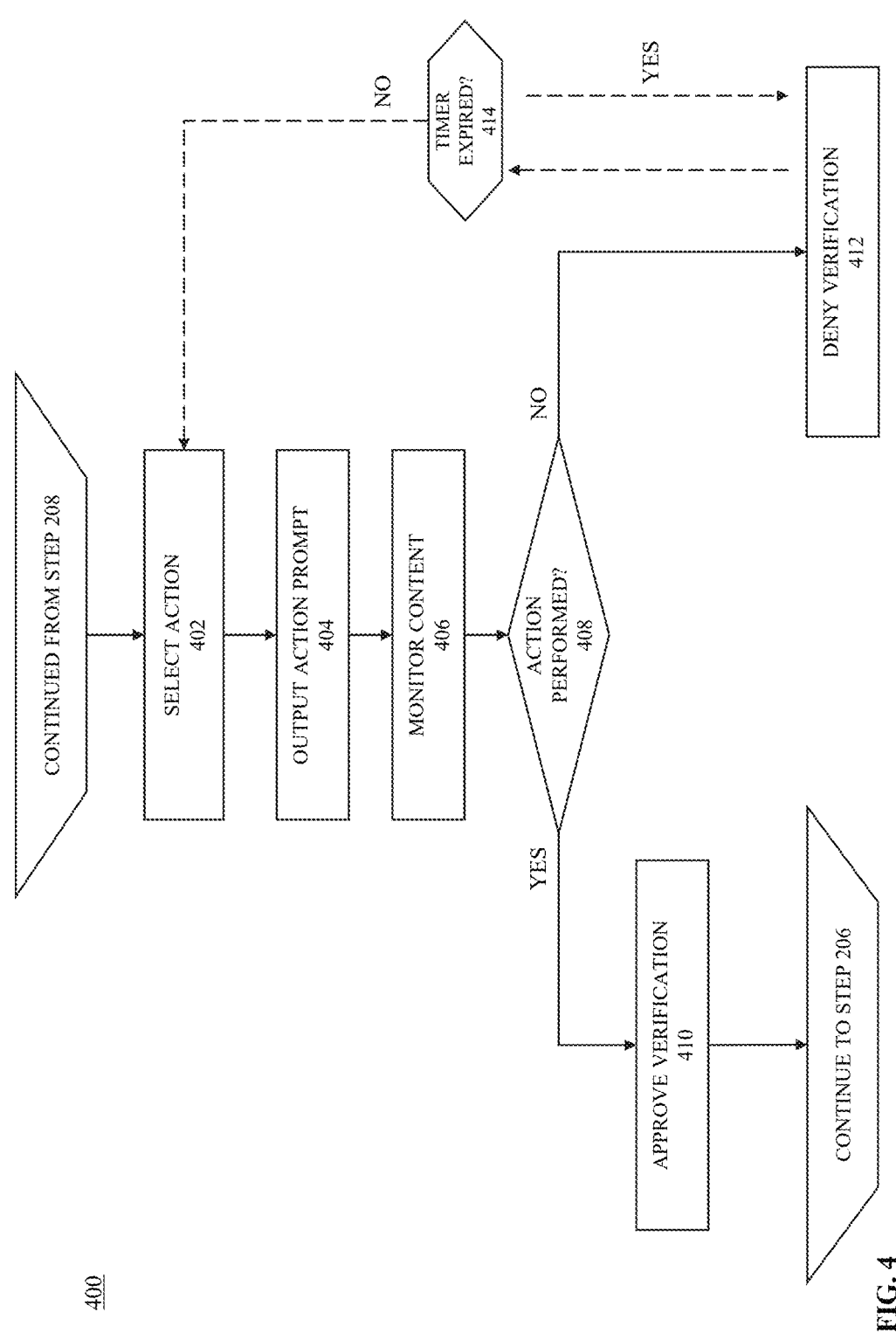
FIG. 4 is a flowchart illustrating an exemplary method for action-based verification of user content.

FIG. 4 is a flowchart 400 providing more detail of step 208 of FIG. 2 for verifying content received by the system. The operation is continued from step 204, and in step 402, the system is configured to select an action-based prompt. As detailed above, an action may relate to a movement or gesture corresponding to one or more body parts of the user. In step 404, the system may output the action-based prompt to a user for performing. In step 406, the system may monitor and analyze the actions of a user. In decision step 408, the system may be configured to determine whether a user has performed an action corresponding to the action-based prompt. If at decision step 408, the system determines that a user has performed an action corresponding to the action-based prompt, in step 410, the system may approve verification of the content and continue to step 206 of FIG. 2

If at decision step 408, the system determines that a user has failed to perform an action corresponding to the action-based prompt, in step 412, the system may deny verification of the content. It is further contemplated that the system may execute a timer after initially denying verification. While the timer is still running, the system may continue to monitor for another instance of an action corresponding to the action-based prompt. More specifically, system may check (e.g., periodically) whether the timer has expired (decision block 414). If the timer has not expired, the system may select another action and return to step 402.

Figure 5:
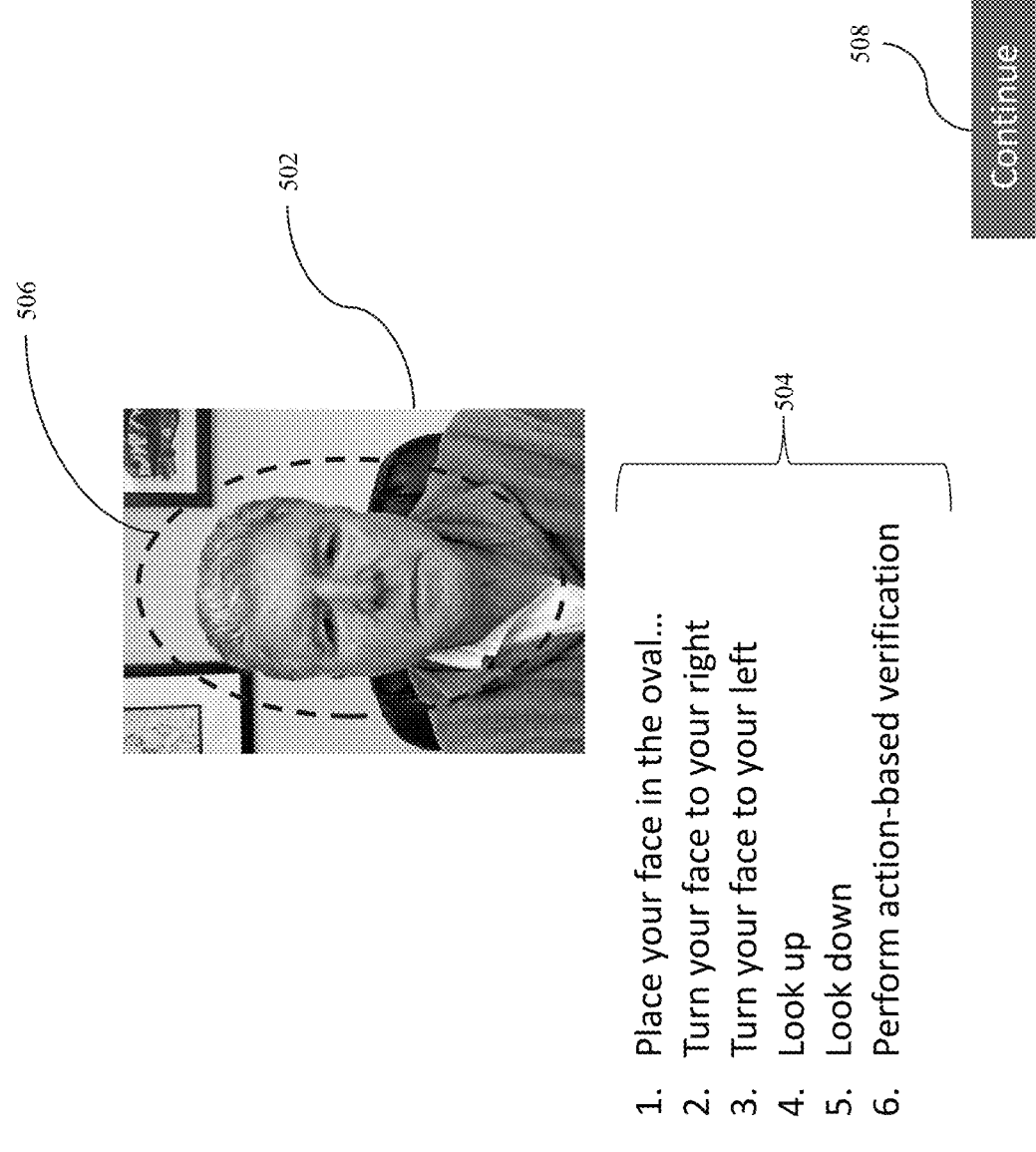
FIG. 5 illustrates an exemplary user interface for capturing and verifying user content.

FIG. 5 illustrates an exemplary user interface 500 for receiving content data. As shown, user interface 500 may include a display portion 502 depicting content captured by the system. Further, user interface 500 may include a set of instructions 504 for capturing and verifying content. For instance, as shown, instructions directed to capturing features of user content may include "place your face in the oval" (oval shown as 506), "turn your face to your right," turn your face to your left," "look up," and "look down." Instructions directed to the verification of content may follow: "Perform action-based verification." One complete, the user may select the continue button 508 to, for example, perform additional verification processes, if necessary.

Figure 6:
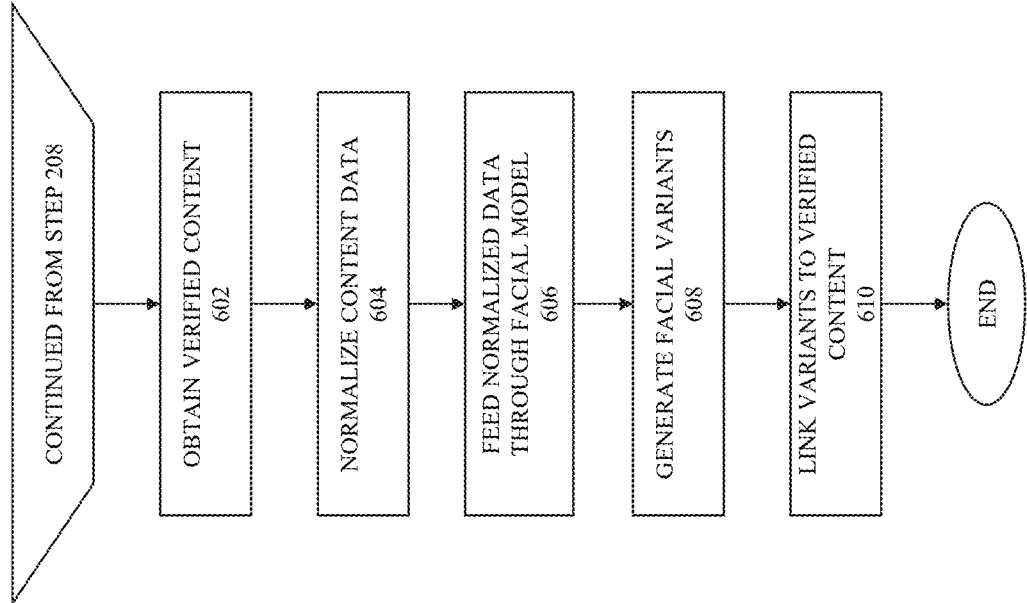
FIG. 6 is a flowchart illustrating an exemplary method for generating and linking facial variants to verified user content.

FIG. 6 illustrates a flowchart 600 for generating one or more variants corresponding to verified content. The operation begins and, in step 602, the system may be configured to obtain verified content, such as from a verified repository accessible to the system. In step 604, the system may be configured to adjust and/or normalize the verified content. Adjusting and/or normalizing the content may facilitate obtaining a baseline or reference frame. In step 606, the normalized content may be fed through one or more facial composite models. In step 608, the system may generate one or more facial composite models. In step 610, the system may link the variants to verified content stored in a repository or another database for searching purposes.

Figure 7:
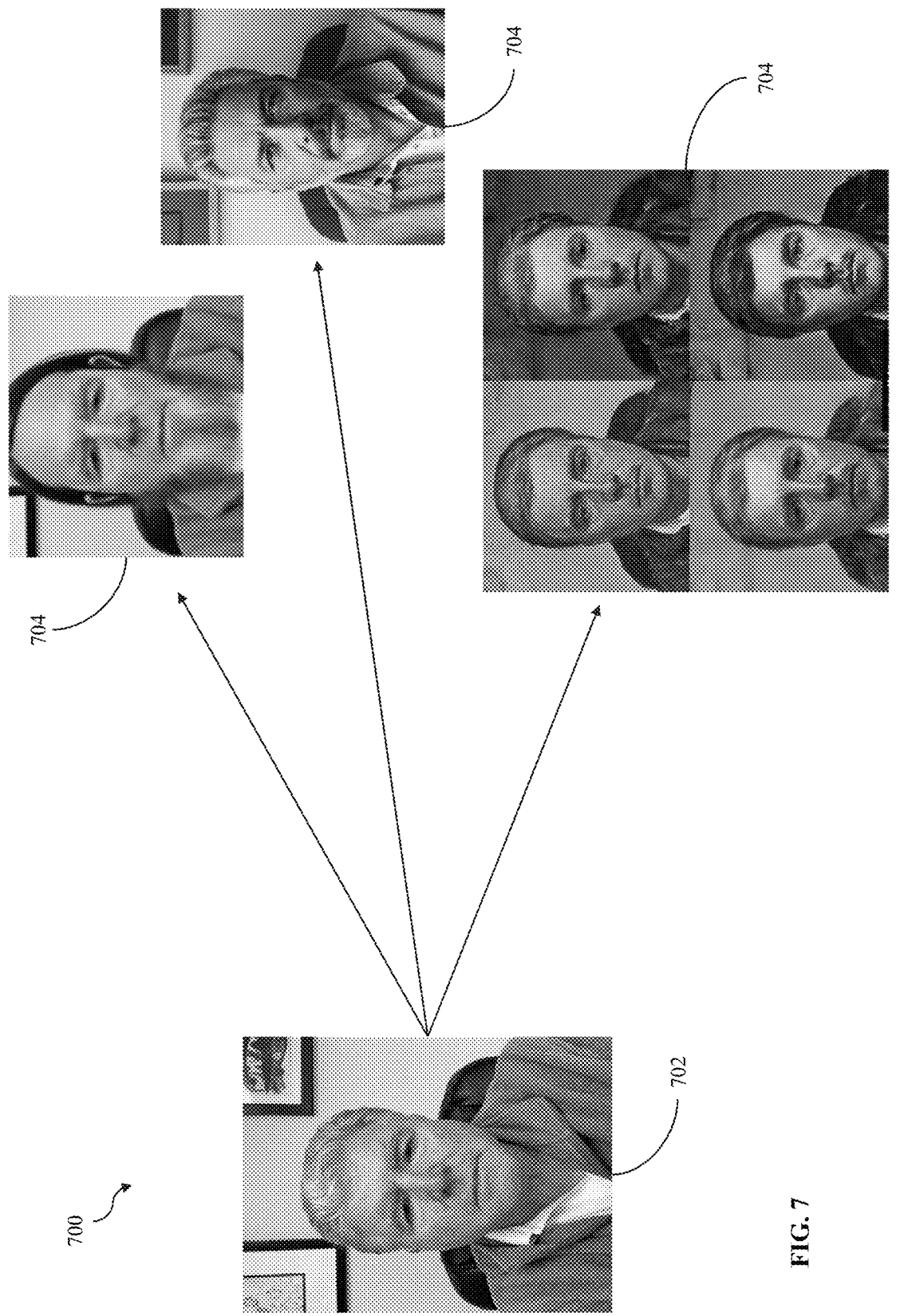
FIG. 7 illustrates exemplary variants configured to be generated by the system.

FIG. 7 illustrates exemplary variants 702 of verified content 704 that the system may be configured to generate. Common generative techniques that the system may implement include, for example, adjusting the age, nationality, hair, facial features, and the like. It is contemplated that a host or provider of tools that generate faces and other images may submit any face their tool generates to the system to, for example, ensure that the generated faces do not match or closely match a verified face of the system. As a result, if a generated face matches a verified face to some degree of approximation, a host or provider of the generation tool may choose to remove the generated face from their system before the generated face is made public. Alternatively, the system may be configured to send an inquiry to the user requesting use of verified content for generating facial variants.

Figure 8:
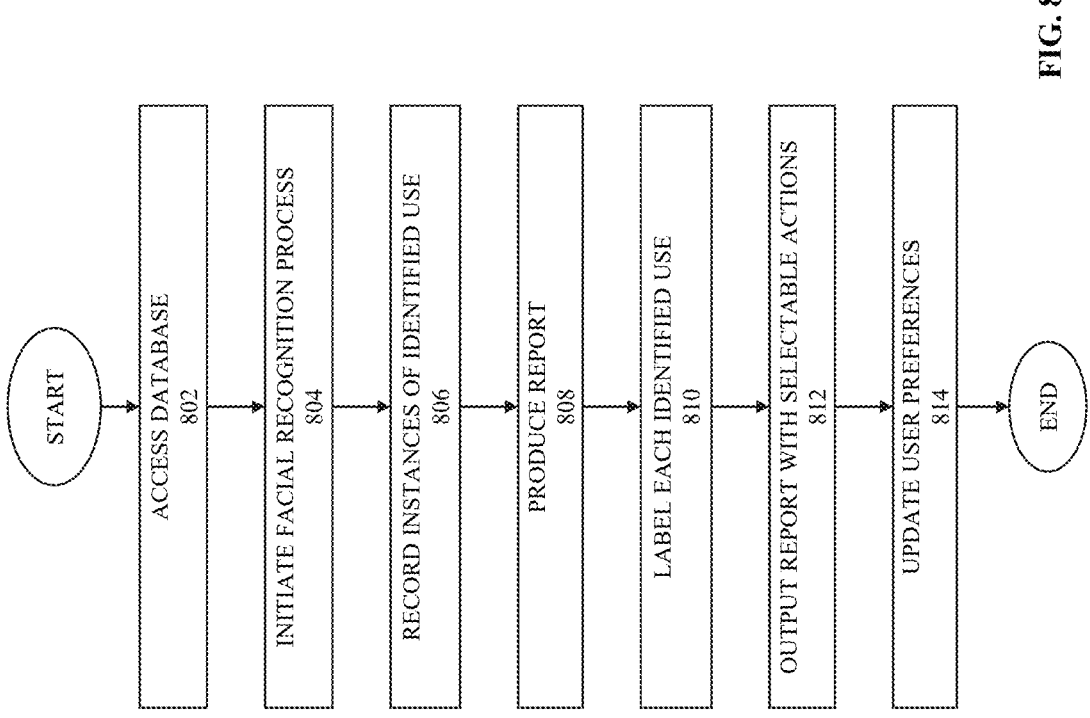
FIG. 8 is a flowchart illustrating an exemplary method for outputting a report including one or more identified instances of use of verified content.

FIG. 8 illustrates a flowchart 800 for outputting a report to a verified user. The method of operation begins and, in step 802, the system may be configured to access a database, such as verified content repository 106 of FIG. 1. In step 804, the system may initiate a facial recognition process to monitor and identify the use of the same or similar content in searchable media.

In one aspect, the system may compare one or more attributes of the verified content with attributes corresponding to content in searchable media, such third-party content published on a social media platform or on other web-based or television-based platforms, and other third-party content accessible to the system. For example, the system may be configured to identify use of verified content by implementing one or more facial recognition techniques, as detailed above.

In step 806, the system may be configured to record instances of use of content that is the same or similar to verified content. For example, the system may identify an instance of use of the same or similar content during the monitoring of a network. In another example, the system may compare facial features extracted from a URL with facial features of the verified content to determine whether there is a match indicating use of the same or similar content.

Further, the system may be configured to calculate a score representing how confident it is that the content identified is the same or similar to the user's verified content. In addition, the system may filter instances of use based on a confidence score. For example, the system may filter detected instances of use of the same or similar content based on predetermined thresholds of confidence ratings. For instance, the system, using the predetermined thresholds, may determine that instances of use with high confidence scores may be recorded for reporting to a user, while instances of use with a low confidence score may be disregarded.

In step 808, the system may be configured to notify the verified user and produce a report of each recorded instance of use of the same or similar content. The report may be in the form of tables, graphs or charts. Furthermore, the report may be organized based on, for example, a user's preferences or a popularity of the webpages recorded. In step 810, the system may be configured to tag and/or label each recorded instance using, for example, public domain information or user feedback. In addition, the system may store the information used for labeling each recorded instance and associate that information with content.

In step 812, the system may output the report to a registered user via a mobile or browser application. It is also contemplated that the system may transmit reports via electronic mail or some other medium for review based on, for example, a user's preferences. Reports may be output to a user periodically, such as weekly, bi-weekly, or monthly. Alternatively, the system may output a report in response to each identified use of the content, for instance, if a potential high threat is detected. In step 814, the system be configured to update corresponding user preferences based on, for example, detecting a selected action, which may then be used in the analysis of each recorded instance output in the report to determine the probability of a threat or a potential abuse of the content.

The report may include data entry controls such as pick lists, checkboxes, numeric boxes, text boxes, and buttons corresponding to an option or action that the registered user may take in relation to an identified instance of use of the same or similar content, as detailed below. For example, the report may include buttons corresponding to one or more of the following options or actions: "Ignore instance," "Ignore Domain," "Report Improper Use," "Add to a Category," "Request Take-Down," "File Copyright," "Take Legal Action." Other contemplated options and actions may include flagging a domain or URL, increase in monitoring frequency, review of educational resources to address unauthorized or illegitimate use of the content, and obtaining mitigation services to address the misuses.

Figure 9:
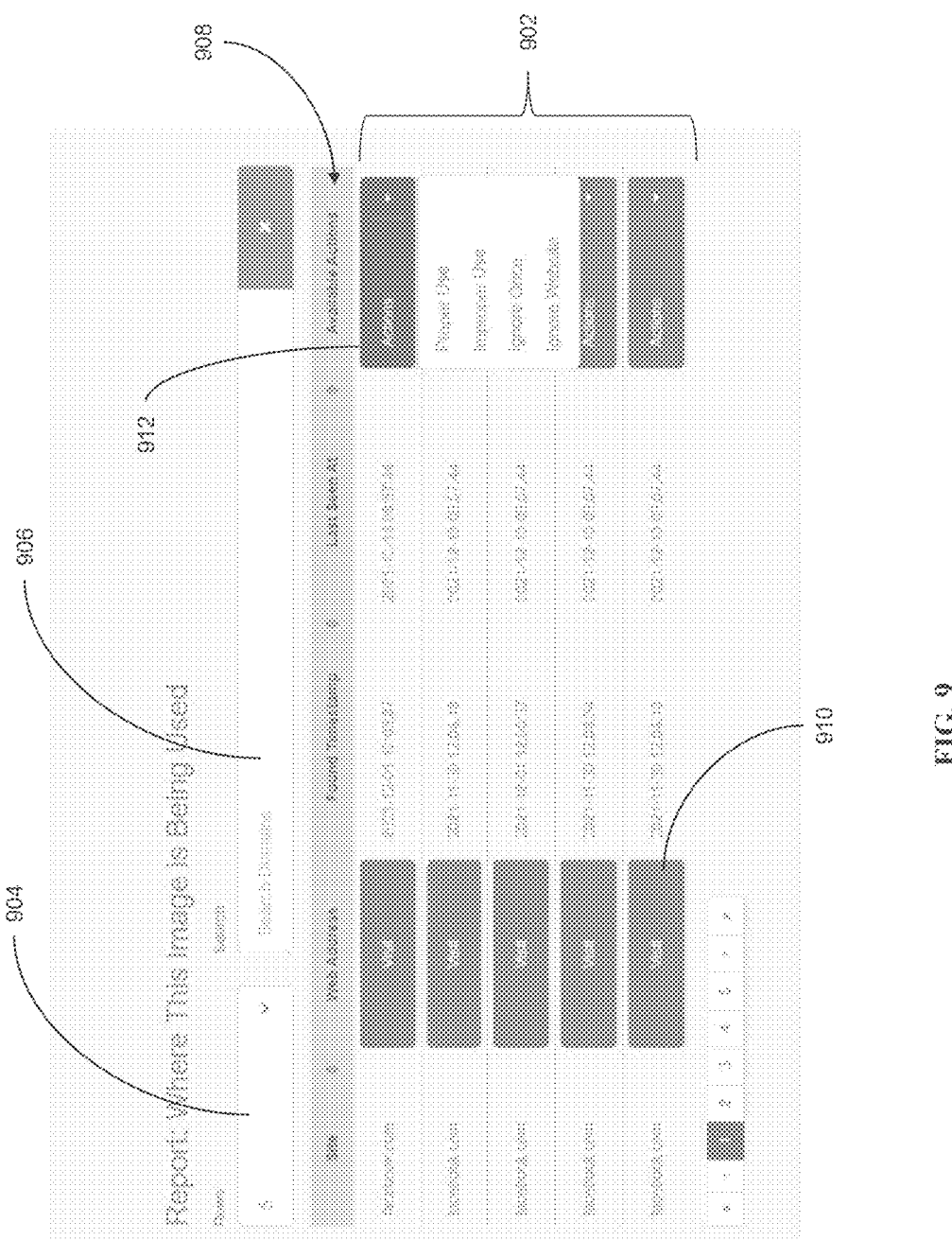
FIG. 9 illustrates an exemplary report including one or more instances of identified uses of verified content and corresponding selectable actions.

FIG. 9 illustrates an exemplary report 900 including one or more identified instances 902 of use of a user's verified content. As shown, exemplary report 900 may include drop-down menu 904 and input field 906 to permit the user to search and/or organize the various information output in exemplary report 900. Furthermore, report 900 may be configured to permit the verified user to sort and/or filter the one or more instances 902 based on certain criteria 908, such as "Site", "Found Timestamp", and "Last Seen At."

As shown, report 900 may further include buttons 910 corresponding to each recorded instance 902. When clicked by the user, buttons 910 facilitate redirecting the user to, for example, the website on which use of the same or similar content was detected. In addition, report 900 may include dropdown controls 916 corresponding to each recorded instance 902. Dropdown controls 912 may permit a user to select one or more actions or options corresponding to the related instance, such as Proper Use," "Improper Use," "Ignore once," and "Ignore Website."

Figure 10:
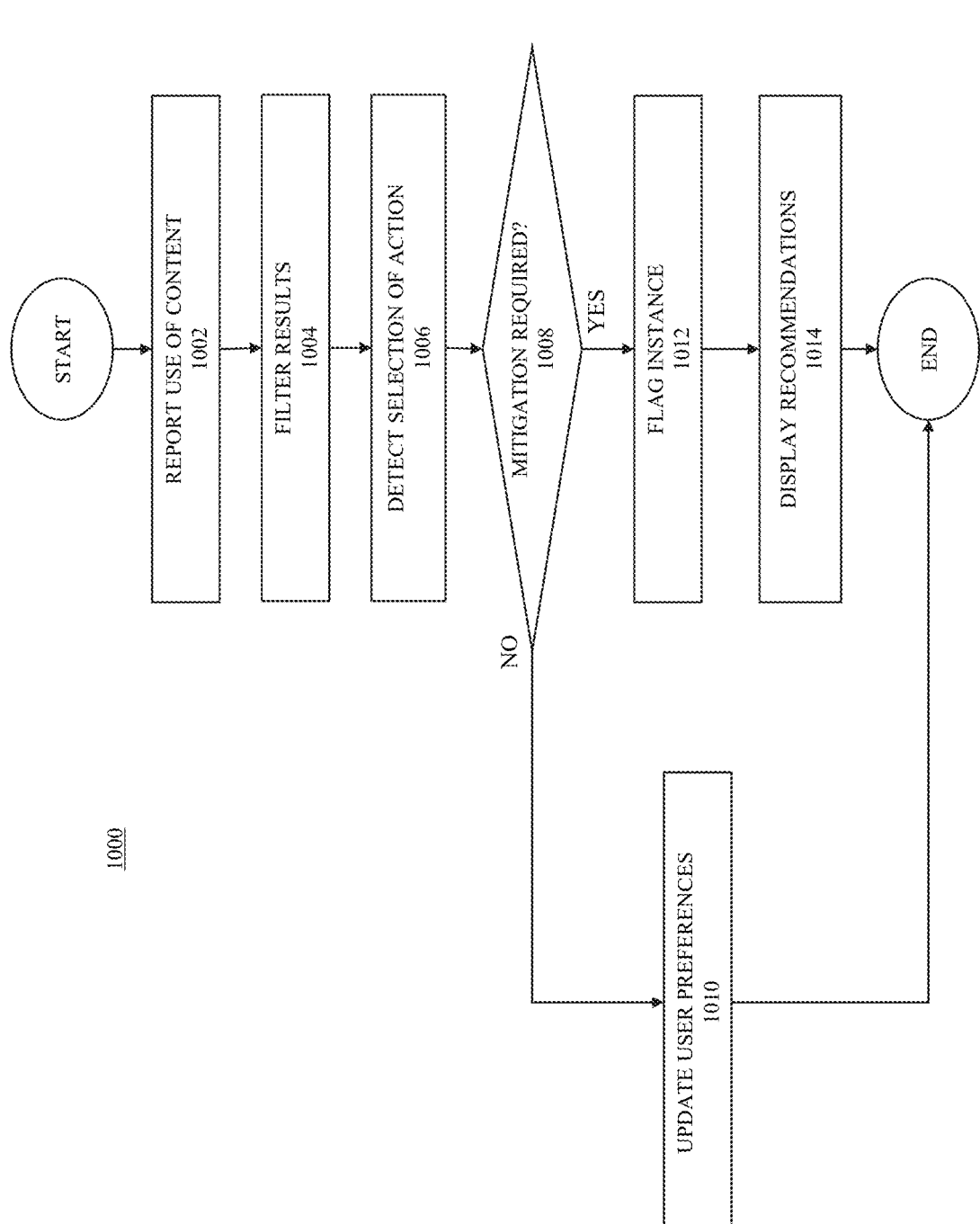
FIG. 10 is a flowchart illustrating an exemplary method for displaying, in response to a user's selection, one or more recommendations corresponding to the identified instance of use of verified content.

FIG. 10 illustrates a flowchart 1000 for displaying one or more recommendations and/or actions corresponding to a recorded instance of identified verified content in a report. The method of operation begins and, in step 1002, the system may distribute a report of identified uses of verified content to a registered user. In step 1004, the system may filter the resulting recorded instances of use based at least in part on the preferences of the verified user. For example, recorded use of content may be filtered based on previous actions taken by the verified user, categories of content, websites identified, a priority and/or a confidence score associated with the content, combinations of each, and the like.

In step 1006, the system may detect a user selection of an action corresponding to the recorded instance of use. In decision step 1008, the system may determine, based on the verified user's selection, whether mitigation is required. Examples of mitigation may include sending a notice and take-down request to an entity associated with a URL (host provider) and redressing the misuse of content, such as pursuing an insurance backstop to reimburse the user for any loss and/or damage.

If, based on the user's selection, no mitigation is required, in step 1010, the system may update the registered user's preference. If at decision step 1008, the system determines that mitigation is required, in step 1012, the system may flag the instance for further review. The review may be automatically performed by the system, stored for access by a third-party system, or distributed to another user of the system, such as a legal professional.

Figure 11:
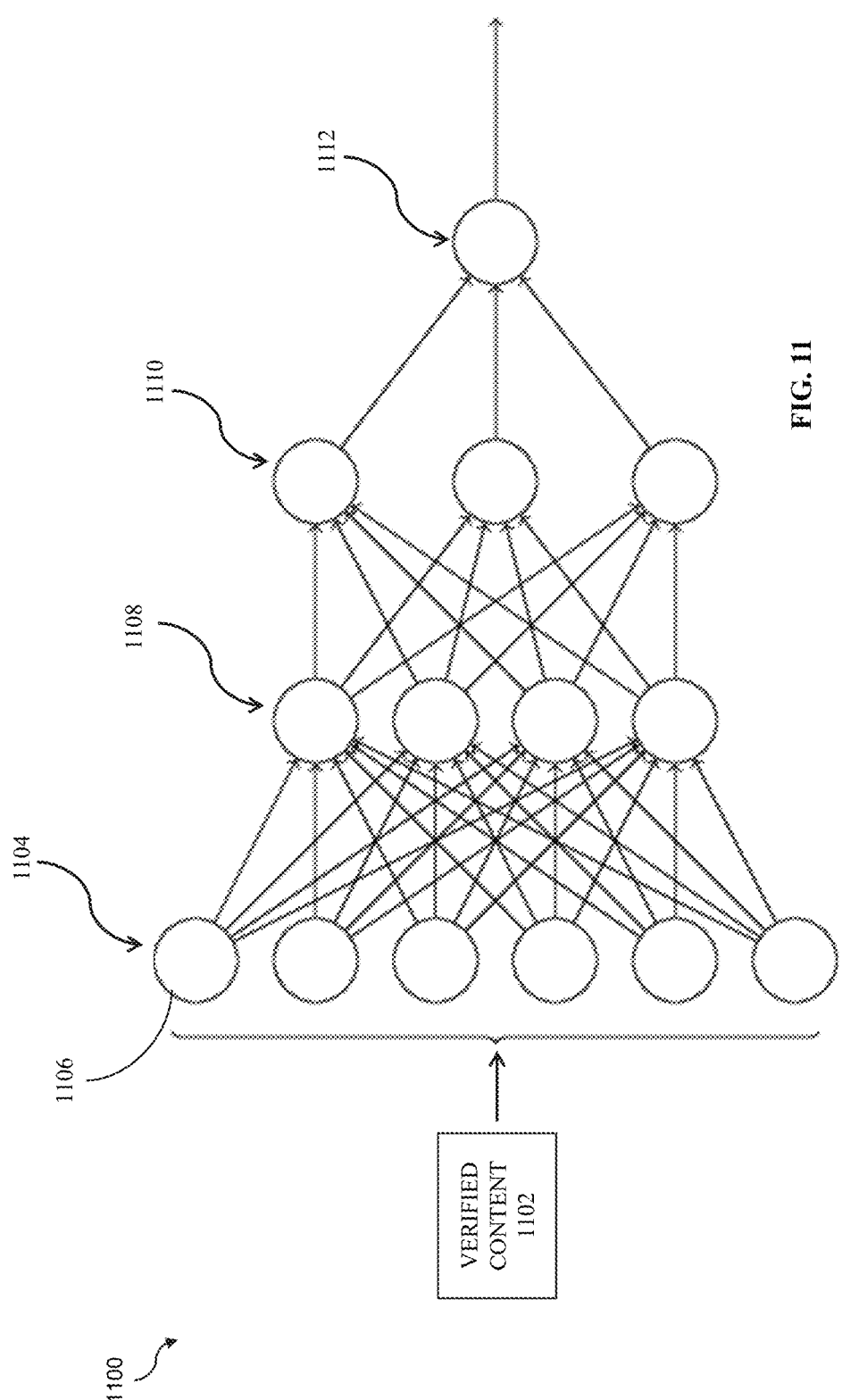
FIG. 11 illustrates an exemplary neural network that may be used to authenticate content.

In step 1014, the system may display one or more recommendations and/or options corresponding to the identified instance of the same or similar content. For example, the system may direct a user to educational materials that may assist in removing the user's content from a URL.
Exemplary Neural Network FIG. 11 illustrates an exemplary neural network 1100 that may be used to implement all or a portion of the methods according to the present invention. For example, the neural network 1100 can be used to determine the susceptibility of content, such as the amount of nudity in an image, and assign a priority score. In another example, the neural network 1100 may be configured to classify content and/or assign a confidence score to monitored content.

As shown, network 1100 may first segment content 1102 into portions of data (such as pixel data). The segmented data may then be input into a first layer 1104—an input layer. Each layer in the neural network 1100 is made up of neurons 1106 that may include learnable weights and biases. The middle layers—for example, 1108 and 1110—are termed "hidden layers." Each hidden layer is fully connected to all neurons in the first input layer 1104. The neurons in each single layer of the hidden layers 1108, 1110 function completely independently and do not share any connections. The last fully-connected layer 1112 is termed the "output layer" and may represent an identified data element, such as a structured data element. In certain embodiments, the neural network 1100 may be positioned between any two layers of a convolutional neural network such that the output layer 1112 acts as an input into another layer of a neural network.

In this embodiment, the hidden layers 1108, 1110 neurons include a set of learnable filters, which can process portions of received content 1102. As the content is processed across each filter, dot products are computed between the entries of the filter and the content 702 to produce an activation map that gives the responses of that filter to the content 1102. The neural network 1100 will learn filters that activate when they detect sensitive features in the content.

In certain embodiments, the machine learning model may be trained to identify minor changes to content features and/or characteristics without changing the essence of the content itself. One example of this would be a compressed version of an image with no changes made to the actual image content. After the algorithm is fed with the training set, it will recognize patterns that are then used to identify instances of use of the same or similar content based on content that has been converted but not manipulated.

Exemplary Computer System

Figure 12:
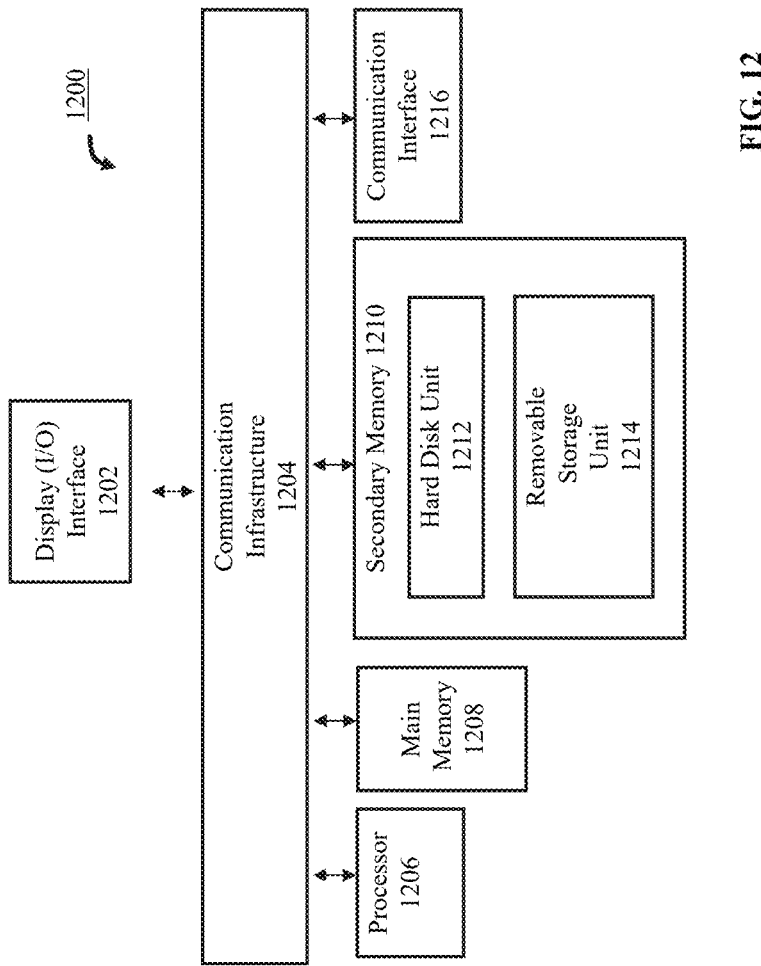
FIG. 12 is an exemplary computing system that may be used for implementation of all or a portion of the invention.

FIG. 12 illustrates a diagram of a system of which may be an embodiment of the present invention. Computer system 1200 includes an input/output interface 1202 connected to communication infrastructure 1204—such as a bus—which forwards data such as graphics, text, and information, from the communication infrastructure 1204 or from a frame buffer (not shown) to other components of the computer system 1200. The input/output interface 1202 may be, for example, a display device, a keyboard, touch screen, joystick, trackball, mouse, monitor, speaker, printer, Google Glass® unit, web camera, any other computer peripheral device, or any combination thereof, capable of entering and/or viewing data.

Computer system 1200 includes one or more processors 1206, which may be a special purpose or a general-purpose digital signal processor configured to process certain information. Computer system 1200 also includes a main memory 1208, for example random access memory (RAM), read-only memory (ROM), mass storage device, or combinations of each. Computer system 1200 may also include a secondary memory 1210 such as a hard disk unit 1212, a removable storage unit 1214, or combinations of each. Computer system 1200 may also include a communication interface 1216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 1208, secondary memory 1210, communication interface 1216, or combinations of each, function as a computer usable storage medium, otherwise referred to as a computer readable storage medium, to store and/or access computer software including computer instructions. For example, computer programs or other instructions may be loaded into the computer system 1200 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 1214 or hard disc unit 1212 to the secondary memory 1210 or through the communication infrastructure 1203 to the main memory 1208 of the computer system 1200.

Communication interface 1216 allows software, instructions and data to be transferred between the computer system 1200 and external devices or external networks. Software, instructions, and/or data transferred by the communication interface 1216 are typically in the form of signals that may be electronic, electromagnetic, optical or other signals capable of being sent and received by the communication interface 1216. Signals may be sent and received using wire or cable, fiber optics, a phone line, a cellular phone link, a Radio Frequency (RF) link, wireless link, or other communication channels.

Computer programs, when executed, enable the computer system 1200, particularly the processor 806, to implement the disclosed methods according to computer software including instructions.

The computer system 1200 described may perform any one of, or any combination of, the steps of any of the methods according to the invention. It is also contemplated that the methods according to the invention may be performed automatically.

The computer system 1200 of FIG. 12 is provided only for purposes of illustration, such that the invention is not limited to this specific embodiment. It is appreciated that a person skilled in the relevant art knows how to program and implement the invention using any computer system.

The computer system 1280 may be a handheld device and include any small-sized computer device including, for example, a personal digital assistant (PDA), hand-held computing device, cellular telephone, or a laptop or netbook computer, mobile console, tablet, or similar hand held computer device, such as an iPad, iPad Touch or iPhone.

Exemplary Cloud Computing System

Figure 13:
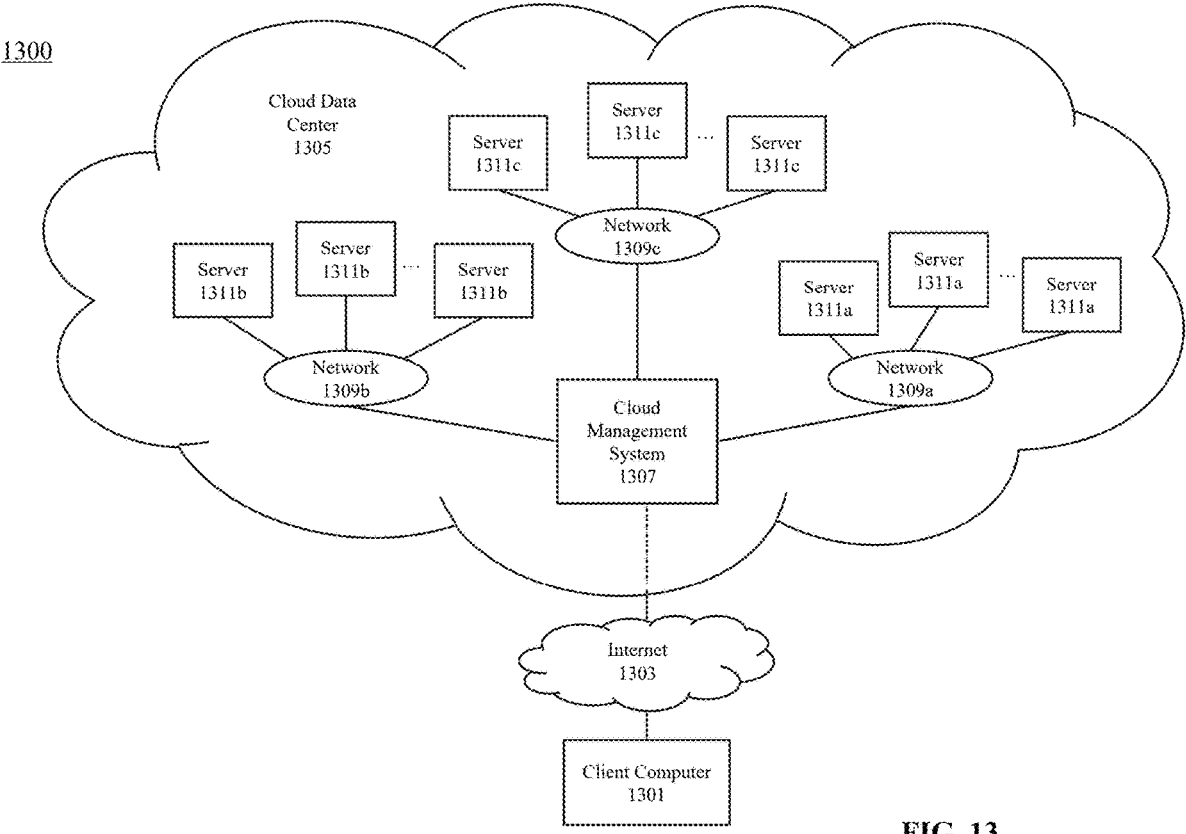
FIG. 13 is an exemplary cloud computing system that may be used for implementation of all or a portion of the invention.

FIG. 13 illustrates an exemplary cloud computing system 1300 that may be an embodiment of the present invention. The cloud computing system 1300 includes a plurality of interconnected computing environments. The cloud computing system 1300 utilizes the resources from various networks as a collective virtual computer, where the services and applications can run independently from a particular computer or server configuration making hardware less important.

Specifically, the cloud computing system 1300 includes at least one client computer 1301. The client computer 1301 may be any device through the use of which a distributed computing environment may be accessed to perform the methods disclosed herein, for example, a traditional computer, portable computer, mobile phone, personal digital assistant, tablet to name a few. The client computer 1301 includes memory such as random access memory (RAM), read-only memory (ROM), mass storage device, or any combination thereof. The memory functions as a computer usable storage medium, otherwise referred to as a computer readable storage medium, to store and/or access computer software and/or instructions.

The client computer 1301 also may include a communications interface, for example, a modem, a network interface (such as an Ethernet card), a communications port, a PCM-CIA slot and card, wired or wireless systems, etc. The communications interface allows communication through transferred signals between the client computer 1301 and external devices including networks such as the Internet 1303 and cloud data center 1305. Communication may be implemented using wireless or wired capability such as cable, fiber optics, a phone line, a cellular phone link, radio waves or other communication channels.

The client computer 1301 establishes communication with the Internet 1303—specifically to one or more servers—to, in turn, establish communication with one or more cloud data centers 1305. A cloud data center 1305 includes one or more networks 1309*a*, 1309*b*, 1309*c* managed through a cloud management system 1307. Each network 1309*a*, 1309*b*, 1309*c* includes resource servers 1311*a*, 1311*b*, 1311*c*, respectively. Servers 1311*a*, 1311*b*, 1311*c* permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 1307 can comprise a dedicated or centralized server and/or other software, hardware, and network tools to communicate with one or more networks 1309*a*, 1309*b*, 1309*c*, such as the Internet or other public or private network, with all sets of resource servers 1311*a*, 1311*b*, 1311*c*. The cloud management system 1307 may be configured to query and identify the computing resources and components managed by the set of resource servers 1311*a*, 1311*b*, 1311*c* needed and available for use in the cloud data center 1305. Specifically, the cloud management system 1307 may be configured to identify the hardware resources and components such as type and amount of processing power, type and amount of memory, type and amount of storage, type and amount of network bandwidth and the like, of the set of resource servers 1311*a*, 1311*b*, 1311*c* needed and available for use in the cloud data center 1305. Likewise, the cloud management system 1307 can be configured to identify the software resources and components, such as type of Operating System (OS), application programs, and the like, of the set of resource servers 1311*a*, 1311*b*, 1311*c* needed and available for use in the cloud data center 1305.

The present invention is also directed to computer products, otherwise referred to as computer program products, to provide software to the cloud computing system 1300. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems (MEMS), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 1300 of FIG. 13 is provided only for purposes of illustration and does not limit the invention to this specific embodiment. It is appreciated that a person skilled in the relevant art knows how to program and implement the invention using any computer system or network architecture.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. A system for identifying a verified user, the system comprising:
   a processor; and
   a non-volatile, non-transitory memory operatively coupled to the processor, the processor operative to:
   receive user content in real-time, said content including a face of the user;
   verify that said content corresponds to said user via an audit of personal information or identification corresponding to the user;
   store verified content and generate, using one or more generative facial models, a plurality of hypothetical facial variants of the verified content, each variant comprising one or more modified facial attribute corresponding to at least one of facial hair, age, and ethnicity, said variants are linked to the verified content;
   initiate a monitoring process to scan a database for the verified content and the variants linked to the verified content, wherein said monitoring process further comprises identifying instances of use of said user's face;
   produce a report for output to a user including the identified instances of use, wherein each identified instance is associated with one or more selectable actions.

2. The system of claim 1, wherein said processor is further operative to determine whether an age associated with the user is above a pre-defined threshold.

3. The system of claim 2, wherein said processor is further operative to analyze the content to predict the age of the user, wherein the predicting comprises training a machine learning model based on the analyzing of the content, wherein the predicting further comprises comparing features of the user's face to the model for probabilistic determination of the user's age.

4. The system of claim 2, wherein said processor is further operative to obtain consent in response to determining that the user's age is below the pre-defined threshold.

5. The system of claim 1, wherein said verification step further comprises:

output one or more prompts to the user;

examine said received real-time content;

approve verification of the user in response to confirming performance of said one or more prompts; and deny verification of the user in response to determining that at least one prompt was not performed.

6. The system of claim 1, wherein said verifying step further includes at least one of an action-based verification, geographical verification, and audit verification.

7. The system of claim 1, wherein said generating step further includes processing said verified content to identify characteristics of said user's face, wherein said characteristics include at least one of eye color, hair color, and dimensions of facial features.

8. The system of claim 7, wherein said processor is further operative to compare the characteristics of the user's face to one or more characteristics of an image in the database.

9. The system of claim 1, wherein said monitoring step further includes accessing said database and analyzing said content using a facial recognition model associated with the user to identify the user and to determine changes in the features of said user's face.

10. The system of claim 1, wherein the one or more selectable actions include at least one of ignore instance, ignore domain, report improper use, add to a category, request take- down, file copyright, take legal action.

11. A method for identifying a verified user, the method comprising:

receiving user content in real-time, said content including a face of the user;

verifying that said content corresponds to said user via an audit of personal information or identification corresponding to the user;

store verified content and generate, using one or more generative facial models, a plurality of hypothetical facial variants of the verified content, each variant comprising one or more modified facial attribute corresponding to at least one of facial hair, age, and ethnicity, wherein said variants are linked to said verified content;

initiating a monitoring process to scan a database for the verified content and the variants linked to the verified content, wherein said monitoring process further comprises identifying instances of use of said user's face;

producing a report for output to a user including the identified instances of use, wherein each identified instance is associated with one or more selectable actions.

12. The method of claim 11, further comprising determining whether an age associated with the user is above a pre-defined threshold.

13. The method of claim 12, further comprising analyzing the content to predict an age of the user, wherein the predicting comprises training a machine learning model based on the analyzed content, wherein the predicting further comprises comparing features of the user's face to the model for probabilistic determination of the user's age.

14. The method of claim 12, further comprising obtaining consent in response to determining that the user's age is below the pre-defined threshold.

15. The method of claim 11, further comprising:

outputting one or more prompts to the user, said one or more prompts corresponding to at least one of an action-based verification, geographical verification, and audit verification;

examining said real-time content;

approving verification of the user in response to confirming performance of said one or more prompts; and denying verification of the user in response to determining that at least one prompt was not performed.

16. The method of claim 11, further comprising processing said verified content to identify characteristics of said user's face, wherein said characteristics include at least one of eye color, hair color, and dimensions of facial features.

17. The method of claim 16, further comparing the characteristics of the user's face to one or more characteristics of an image in the database.

18. The method of claim 11, further comprising accessing said database and analyzing said content using a facial recognition model associated with the user to identify the user and to determine changes in the features of said user's face.

19. The method of claim 11, wherein the one or more selectable actions include at least one of ignore instance, ignore domain, report improper use, add to a category, request take-down, file copyright, take legal action.

20. The method of claim 11, further comprising assigning a priority score to said verified content based on the user's features, wherein a frequency of the monitoring process corresponds to the priority score.

*  *  *  *  *